Patented May 2, 1939

2,156,488

UNITED STATES PATENT OFFICE 2,156,488

MANUFACTURE OF DEXTRINE IN A HEATED LIQUID MEDIUM

Harold E. Bode, Chicago, Ill., assignor, by mesne assignments, to Corn Products Refining Company, New York, N. Y., a corporation of New Jersey No Drawing. Application August 16, 1937,
Serial No. 159,380

1 Claim. (Cl. 127—38)

This invention relates to the production of modified starches and the principal object of the invention is to provide an improved method of modifying starches.

Another object is to provide a method whereby starch can be modified to the desired extent in a shorter time than consumed by processes heretofore employed.

Another object is to provide a method in which the modification is uniform, readily controllable, and yields an improved product.

A further object is to provide for the production of a modified starch under completely anhydrous conditions.

Other objects will be apparent from the following detailed description.

According to methods now commonly employed dextrine, for example, is manufactured by means of heating low moisture starch in a dextrine cooker provided with steam coils, the actual heating or roasting of the starch being accomplished by the heated air within the dextrine cooker. The process takes from 15 to 20 hours.

One objection to this method is that it takes several hours after a batch of starch is charged into a dextrine cooker for the air to reach a dextrinizing temperature. Furthermore, it is difficult to obtain a uniform distribution so that each part of each starch particle is dextrinized to the same degree. This is accomplished to some extent by agitating the starch particles in the cooker but despite this the finished dextrine according to present methods is really a crude mixture of starch granules which have been subjected to various dextrinization stages by the non-uniform heat application of the heated air in the dextrine cooker.

According to the present invention the desired modification of the starch is obtained in from 5 to 6 hours and in a much more uniform manner by substituting for the heated air medium of the cooker a heated liquid medium in which the starch is suspended.

In carrying out the invention starch is gradually added to a petroleum or mineral oil until the proportions are approximately two parts oil to one part starch. To obtain a relatively uniform suspension the oil is constantly stirred as the starch is added and, preferably, during the operations that follow. With the starch uniformly suspended, the oil is heated to the required temperature, depending upon the degree of modification desired, and held at that temperature until the starch has reached the desired degree of modification. For general purposes the temperature will range between 345° to 385° F. but under certain conditions, where color or pasting qualities are important the temperature will be initially maintained at temperatures as low as 100° F. and then gradually raised.

When the desired quality is obtained the liquor is cooled and filtered and the filter cake washed with a low boiling point oil solvent, such as carbon-tetrachloride. After drying the washed filter cake and recovering the washing liquid the resultant product is, before use, preferably allowed to adsorb moisture from the air.

As will be noted, the above process is free from such objections as improper heat radiation or distribution, non-uniform dextrinized starch particles, variable losses of converting agents through volatilization and the influence of the air. These are either not present or can be readily controlled whereas in dextrine cookers heretofore used such control is impossible.

Furthermore the heating is direct and, since oil is a much better heat conductor than air, it becomes effective almost immediately with the result that dextrine can be manufactured in from one-third to one-fourth of the time which it takes with the air heated dextrine cooker.

By controlling the temperature of the oil or the time of treatment, or both, any desired degree of modification can be obtained.

The process is also readily adaptable for producing modified starches under completely anhydrous conditions, thus avoiding objectionable results heretofore obtained. For example, when ordinary air dry starch, containing from 5%–15% water, is converted into dextrine a certain amount of hydrolysis takes place with the result that the dextrine is contaminated with sugars and possibly other conversion products. This adversely affects the pasting properties, retarding adhesion and drying. Consequently the drier the starch the better the dextrine produced.

Therefore, by suspending in the liquid heating medium a completely anhydrous starch, i. e. a starch which has been vacuum dried to approximately zero moisture content and the water thus removed has been replaced by a water-immiscible liquid (gas), a superior quality of dextrine will result. Propylene dichloride, for example, will serve to advantage, it being completely miscible with the mineral oil and readily recoverable from the oil suspension when the temperature reaches 212° F., the boiling point of the propylene dichloride.

According to present practice dextrines are frequently cooked in the dextrine cooker in conjunction with various converting agents such as muriatic acid or calcium chloride. These converting agents can also be introduced into the heated mineral oil medium in an anhydrous condition by taking advantage of the solubility of these materials in organic liquids which are also miscible with mineral oils. Thus, for example, muriatic acid, which is normally a mixture of water and hydrogen chloride, can be introduced into the heating medium by dissolving dry anhydrous hydrogen chloride gas into chloroform (or alcohol or ether) and then dissolving the hydrogen chloride mixture directly into the heating medium.

It will be understood that the above description is merely illustrative of the invention and many modifications within the scope thereof will suggest themselves. Any other suitable heating medium may be employed such as corn oil, for example but, preferably, such heating medium should be inert, high boiling and water immiscible. The percentages and temperatures may be varied depending on the physical and chemical characteristics of the particular starch to be treated. Other well known converting agents may be used. It is intended to cover all modifications and equivalents falling within the scope of the following claim.

I claim:

Method of dextrinizing starch under completely anhydrous conditions which comprises vacuum drying starch to approximately zero moisture content, adsorbing a water-immiscible liquid into the starch in the absence of air, suspending the anhydrous starch thus produced in an oil, and heating the oil to a starch dextrinizing temperature.

HAROLD E. BODE.